United States Patent
Nimbalker et al.

(10) Patent No.: US 10,028,267 B2
(45) Date of Patent: *Jul. 17, 2018

(54) METHOD AND APPARATUS FOR SIGNALING APERIODIC CHANNEL STATE INDICATION REFERENCE SIGNALS FOR LTE OPERATION

(71) Applicant: Motorola Mobility LLC, Chicago, IL (US)

(72) Inventors: Ajit Nimbalker, Buffalo Grove, IL (US); Vijay Nangia, Algonquin, IL (US); Murali Narasimha, Vernon Hills, IL (US); Ravikiran Nory, Buffalo Grove, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/650,954

(22) Filed: Jul. 16, 2017

(65) Prior Publication Data

US 2017/0318568 A1    Nov. 2, 2017

Related U.S. Application Data

(63) Continuation of application No. 14/672,356, filed on Mar. 30, 2015, now Pat. No. 9,743,392.

(51) Int. Cl.
*H04W 72/04* (2009.01)
*H04L 5/00* (2006.01)
(Continued)

(52) U.S. Cl.
CPC ........... *H04W 72/042* (2013.01); *H04L 5/001* (2013.01); *H04L 5/0048* (2013.01);
(Continued)

(58) Field of Classification Search
CPC .............. H04W 72/042; H04W 16/14; H04W 72/0433; H04W 72/085; H04W 72/0426;
(Continued)

(56) References Cited

U.S. PATENT DOCUMENTS

| | | | | |
|---|---|---|---|---|
| 8,675,588 B2* | 3/2014 | Fujishima | ........... | H04W 72/085 370/329 |
| 8,879,496 B2* | 11/2014 | Dinan | .................. | H04B 7/0456 370/329 |

(Continued)

FOREIGN PATENT DOCUMENTS

WO    20140183302 A1    11/2014

OTHER PUBLICATIONS

Qualcomm Incorporated: Small cell on/off time reduction. Agenda item: 7.2.4.2.1. 3GPP TSG-RAN WG1 #76, R1-140452, Feb. 10-Feb. 14, 2014, Prague, Czech Republic, all pages.
(Continued)

*Primary Examiner* — Brian O'Connor
(74) *Attorney, Agent, or Firm* — Matthew C. Loppnow; The Watson I.P. Group PLC

(57) ABSTRACT

A User Equipment (UE) can receive Downlink Control Information (DCI) from a base station. The DCI can contain a Channel State Information (CSI) request on a physical control channel in a subframe of a first serving cell. The CSI request can direct the UE to perform CSI measurements for at least one aperiodic Channel State Information Reference Signal (CSI-RS) of a second serving cell. The UE can ascertain CSI-RS resources in a subframe of the second serving cell based on at least the DCI contents. The UE can determine CSI based on the ascertained CSI-RS resources. The UE can send the determined CSI to the base station.

18 Claims, 9 Drawing Sheets

(51) Int. Cl.
| | |
|---|---|
| *H04L 27/26* | (2006.01) |
| *H04W 72/08* | (2009.01) |
| *H04B 7/024* | (2017.01) |
| *H04W 16/14* | (2009.01) |

(52) U.S. Cl.
CPC .......... *H04L 5/0057* (2013.01); *H04L 5/0094* (2013.01); *H04L 27/2611* (2013.01); *H04B 7/024* (2013.01); *H04L 5/0066* (2013.01); *H04L 5/0073* (2013.01); *H04L 5/0091* (2013.01); *H04W 16/14* (2013.01); *H04W 72/0426* (2013.01); *H04W 72/0433* (2013.01); *H04W 72/085* (2013.01)

(58) Field of Classification Search
CPC ..... H04L 5/0094; H04L 5/001; H04L 5/0057; H04L 5/0048; H04L 27/2611; H04L 5/0073; H04L 5/0066; H04L 5/0091; H04B 7/024
See application file for complete search history.

(56) References Cited

U.S. PATENT DOCUMENTS

| | | | |
|---|---|---|---|
| 9,210,602 B2* | 12/2015 | Mondal | H04W 24/08 |
| 9,743,392 B2* | 8/2017 | Nimbalker | H04W 72/042 |
| 2013/0039284 A1 | 2/2013 | Marinier | |
| 2013/0242902 A1 | 9/2013 | Liu | |
| 2013/0244709 A1 | 9/2013 | Davydov | |
| 2013/0322276 A1 | 12/2013 | Pelletier | |
| 2014/0010126 A1 | 1/2014 | Sayana | |
| 2014/0036796 A1 | 2/2014 | Etemad | |
| 2014/0119266 A1 | 5/2014 | Ng | |
| 2014/0126496 A1 | 5/2014 | Sayana | |
| 2015/0016291 A1 | 1/2015 | Kim | |
| 2015/0124691 A1 | 5/2015 | Li | |
| 2015/0180634 A1 | 6/2015 | Hoshino | |
| 2015/0207600 A1 | 7/2015 | Park | |
| 2015/0280878 A1 | 10/2015 | Lee | |
| 2015/0282202 A1 | 10/2015 | Miao | |
| 2015/0312927 A1 | 10/2015 | Ko | |
| 2015/0358094 A1 | 12/2015 | Yi | |
| 2016/0080121 A1 | 3/2016 | Kim | |
| 2016/0105817 A1 | 4/2016 | Frenne | |
| 2016/0135148 A1 | 5/2016 | Novlan | |
| 2016/0204910 A1 | 7/2016 | Kim | |
| 2016/0227519 A1 | 8/2016 | Nimbalker | |
| 2016/0227548 A1 | 8/2016 | Nimbalker | |
| 2016/0323901 A1 | 11/2016 | Yum | |
| 2016/0330011 A1 | 11/2016 | Lee | |
| 2016/0352396 A1 | 12/2016 | Seol | |
| 2017/0034727 A1 | 2/2017 | Li | |
| 2017/0093474 A1 | 3/2017 | Lee | |
| 2017/0164226 A1 | 6/2017 | Wei | |

OTHER PUBLICATIONS

Huawei, Hsilicon: Further analysis on the required funtionalities for LAA, Agenda item: 6.3.2.2, R1-144590, 3GPP TSG RAN WG1 Meeting #79, San Francisco, USA, Nov. 17-21, 2014, all pages.
Oconnor, Notice of References Cited, PTO-892, U.S. Appl. No. 14/672,356, U.S. Patent and Trademark Office, dated Sep. 23, 2016.
Oconnor, Notice of References Cited, PTO-892, U.S. Appl. No. 14/672,356, U.S. Patent and Trademark Office, dated Apr. 19, 2017.
Tanbourgi, PCT International Search Report, International application No. PCT/2016/012521, European Patent Office, Rijswijk, NL, dated Apr. 19, 2016.
ETSI: "LTE; Evolved Universal Terrestrial Radio Access (E-UTRA); Radio Resource Control (RRC); Protocol specification (3GPP TS 36.331 version 12.3.0 Release 12)", Sep. 23, 2014 (Sep. 23, 2014).
ETSI: "LTE; Evolved Universal Terrestrial Radio Access (E-UTRA); Physical layer procedures (3GPP TS 36.213 version 12.3.0 Release 12)", Sep. 26, 2014 (Sep. 26, 2014).
"LTE; Evolved Universal Terrestrial Radio Access (E-UTRA); Physical channels and modulation (3GPP TS 36.211 version 12.3.0 Release 12)", Technical Specification, European Telecommunications Standards Institute (ETSI), 650, Route Des Lucioles; F-06921 Sophia-Antipolis; France, vol. 3GPP RAN 1, No. V12.3.0, Oct. 1, 2014 (Oct. 1, 2014).
"3rd Generation Partnership Project; Technical Specification Group Radio Access Network; Study on Licensed-Assisted Access to Unlicensed Spectrum; (Release 13)", 3GPP Draft; 36889-011, 3rd Generation Prtnership Project (3GPP), Mobile Competence Cenre; 650, Route Des Lucioles; F-06921 Sophia-Antipolis Cedex; France, Dec. 1, 2014 (Dec. 1, 2014).
Martinez, PCT International Search Report, International application No. PCT/US2016/016869, European Patent Office, Rijswijk, NL, dated May 24, 2016.
LG Electronics: "PDSCH RE mapping in relation to ZP CSI-RS resources and IMRs", 3rd Generation Partnership Project (3GPP), Mobile Competence Centre; 650, Rout Des Lucioles; F-06921 Sphia-Antipolis Cedex; France, vol. RAN WG1, No. New Orleans, USA Nov. 12, 2012-Nov. 16, 2012, Nov. 3, 2102 (Nov. 3, 2102).
Motorola Mobility: "CSI measurement and reporting for LAA", 3GPP Draft; R1-155780_LAA_CSI_REPORTING_FINAL, 3rd Generation Partnership Project (3GPP), Mobile Competence Center; 650, Route Des Lucioles; F-06921 Sophia-Antipolis Cedex; France, vol. RAN WG1, No. Malmo, Sweden; Oct. 5, 2015-Oct. 9, 2015, Sep. 26, 2015 (Sep. 26, 2015).
Mills, Notice of References Cited, PTO-892, U.S. Appl. No. 14/672,342, U.S. Patent and Trademark Office, dated Feb. 9, 2017.
Nguyen, Notice of References Cited, PTO-892, U.S. Appl. No. 15/396,412, U.S. Patent and Trademark Office, dated Sep. 19, 2017.
Mills, Notice of References Cited, PTO-892, U.S. Appl. No. 141671342, dated Jan. 2, 20018, U.S. Patent and Trademark Office.

* cited by examiner

METHOD AND APPARATUS FOR SIGNALING APERIODIC CHANNEL STATE INDICATION REFERENCE SIGNALS FOR LTE OPERATION

BACKGROUND

1. Field

The present disclosure is directed to a method and apparatus for signaling aperiodic channel state indication reference signals. More particularly, the present disclosure is directed to a method and apparatus for signaling aperiodic channel state indication reference signals for Long Term Evolution (LTE) operation in unlicensed spectrum.

2. Introduction

Presently, users use portable devices, otherwise known as User Equipment (UE), such as smartphones, cell phones, tablet computers, selective call receivers, and other wireless communication devices, on LTE networks. Users use the UEs to download files, music, e-mail messages, and other data, as well as to watch streaming video, play streaming music, play games, surf the web, and engage in other data intensive activities. Because of large amounts of downloaded data as well as large amounts of users, LTE carriers can now use unlicensed spectrum to complement the bandwidth of their LTE networks to provide faster data to users. This allows the users to download data faster on their portable devices. For example, unlicensed spectrum can include spectrum at 5 GHz (e.g. used by WiFi) and other unlicensed spectrum. LTE technology can be deployed in unlicensed spectrum using the carrier aggregation framework wherein the primary cell uses licensed spectrum, and a secondary cell is deployed in the unlicensed spectrum. Transmissions on the unlicensed carrier typically have to follow Discontinuous Transmission requirements (DCT requirements) due to regulatory requirements and due to the need to co-exist with other wireless systems operating in the same spectrum, such as Wi-Fi systems, LTE devices, such as User Equipment (UE), and base stations, such as Enhanced Node-B's (eNBs). In some regulations, a LTE device may be required to perform listen-before-talk (LBT) prior to transmitting on a carrier. If the device finds that the channel is busy, then it should defer its transmission until the carrier become clear. For DCT, after acquiring the channel, a LTE device can continuously transmit for X ms, where X=4 ms for some regulations and X=up to 13 ms for other regulations. After X ms the device has to cease transmission for some duration, sometimes referred as an idle period, perform LBT channel assessment, and reinitiate transmission only if LBT is successful. As a result of the discontinuous transmission, transmission of frames and reference signals in unlicensed spectrum can be aperiodic.

Unfortunately, because the transmission of frames and reference signals are aperiodic, a UE has problems determining how to measure a reference signal to ascertain channel state information to report it to a base station.

Thus, there is a need for a method and apparatus for signaling channel state information reference signals for LTE operation.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope.

DETAILED DESCRIPTION

Embodiments can provide for a User Equipment (UE) that can receive Downlink Control Information (DCI) from a base station. The DCI can contain a Channel State Information (CSI) request on a physical control channel in a subframe of a first serving cell. The CSI request can direct the UE to perform CSI measurements for at least one aperiodic Channel State Information Reference Signal (CSI-RS) of a second serving cell. The UE can ascertain CSI-RS resources in a subframe of the second serving cell based on at least the DCI contents. The UE can determine CSI based on the ascertained CSI-RS resources. The UE can then send the determined CSI to the base station.

Embodiments can further provide for a UE that can receive Zero Power Channel State Information Reference Signal (ZP-CSI-RS) configuration information for an aperiodic ZP-CSI-RS of a serving cell. The UE can receive DCI on a physical control channel in a subframe of the serving cell. The DCI can indicate whether a Physical Downlink Shared Channel (PDSCH) of the UE in the subframe of the serving cell is rate-matched around resource elements indicated by the ZP-CSI-RS configuration information. The UE can decode the PDSCH in the subframe of the serving cell based on rate-matching around the resource elements indicated by the ZP-CSI-RS configuration when the DCI indicates the PDSCH of the UE is rate-matched around the resource elements indicated by the ZP-CSI-RS configuration.

Embodiments can further provide for signaling channel state information reference signals for Long Term Evolution (LTE) operation in unlicensed spectrum. For example, embodiments can provide mechanisms in Release 13 LTE to deliver downlink CSI-RS and associated control information from a multi-antenna base station (eNB) to a User Equipment (UE) to assist the eNB in its multi-antenna precoding operations, as applied to LTE License-Assisted Access (LTE-LAA) deployment scenarios in which the CSI-RS's are transmitted to the UE on a secondary carrier operating in unlicensed spectrum. Access to the unlicensed spectrum at any given time and location can depend on whether the unlicensed spectrum is not being used by others, so the eNB may not rely on transmitting the CSI-RS on a duty cycle as is done in previous LTE releases.

The UE-specific configuration of the CSI-RS resources can be done on higher layers, and one problem solved can be how to notify the UE of which received subframe contains the CSI-RS transmissions. According to a possible embodiment, when the UE receives a DL grant on the unlicensed carrier in a subframe, the grant contains a CSI-RS request, so the UE knows that an aperiodic CSI-RS transmission is in the subframe. The UE measures the CSI-RS and reports the CSI to the eNB. The CSI report can include one or more of CQI (Channel Quality Information), RI (Rank Information), PMI (Precoding Matrix Indication), PTI (Precoder Type Indication) and/or other information.

Figure 1:
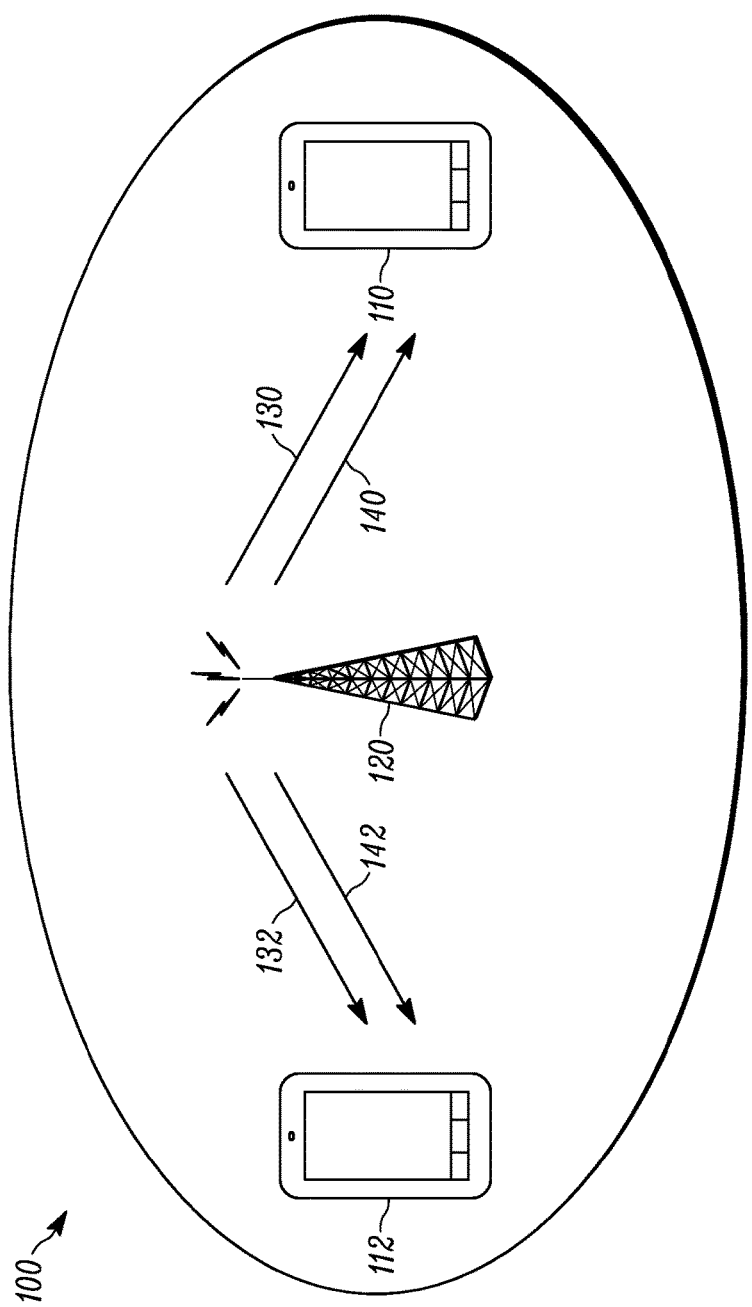
FIG. 1 is an example block diagram of a system according to a possible embodiment.

FIG. 1 is an example block diagram of a system 100 according to a possible embodiment. The system 100 can include a first UE 110 and a base station 120, such as an Enhanced Node-B (eNB). The first UE 110 and the base station 120 can communicate on different cells 130 and 140. The cell 130 can be a first cell, such as a primary cell and the UE 110 can be connected to the primary cell. The cell 140 can be a second cell, such as a secondary cell. Furthermore, the second cell 140 can be a cell that operates on unlicensed spectrum. The cells 130 and 140 can also be cells associated with other base stations, can be a macro cells, can be micro cells, can be femto cells, and/or can be any other cells useful for operation with a LTE network. The system 100 can also include a second UE 112 that can communicate with the base station 120 on cells 132 and 142 in a similar manner to the first UE 110. The UE's 110 and 112 can be any devices that can access a wireless wide area network. For example, the user devices 110 and 112 can be wireless terminals, portable wireless communication devices, smartphones, cellular telephones, flip phones, personal digital assistants, personal computers having cellular network access cards, selective call receivers, tablet computers, or any other device that is capable of operating on a wireless wide area network.

Figure 2:
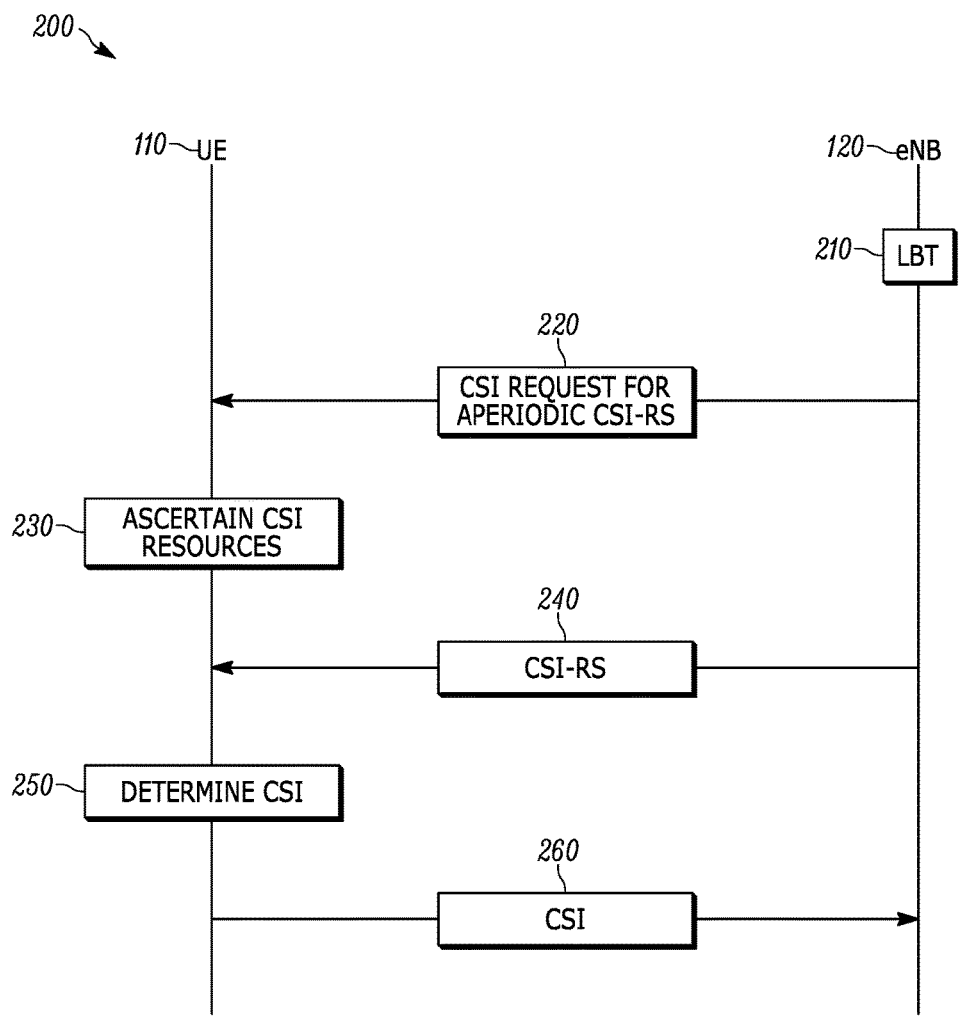
FIG. 2 is an example signal flow diagram according to a possible embodiment.

FIG. 2 is an example signal flow diagram 200 according to a possible embodiment. The signal flow diagram 200 shows signals and operations of the UE 110 and the base station 120. From the base station perspective, at 210, the base station 110 may or may not perform a Listen-Before-Talk (LBT) procedure to determine if a carrier is clear for a carrier frequency corresponding to a second serving cell, such as second cell 140, prior to sending the aperiodic CSI-RS on the second serving cell. The LBT procedure can be performed to determine if the carrier is clear for transmissions.

At 220, the base station 120 can transmit DCI in a subframe to the UE 110. The DCI can contain a CSI request on a physical control channel in a subframe of a first serving cell, such as the first cell 130. The CSI request can direct the UE 110 to perform CSI measurements for at least one aperiodic CSI-RS of the second serving cell. The DCI can include an indication of resources for the aperiodic CSI-RS in a subframe of the second serving cell. The second serving cell may or may not operate in an unlicensed spectrum.

Contents of the DCI for determining the CSI-RS resources can be in a CSI request field and/or another field of a control channel. The DCI can also indicate granted resources on which the CSI is sent by the UE 110 to the base station 120. For example, the base station 120 can indicate to the UE 110 which resources it is granted for sending the CSI to the base station 120. The CSI-RS resources in the subframe can be based on a higher layer signaled CSI-RS configuration for aperiodic CSI-RS transmission, where the higher layer can be a layer higher than a physical layer.

At 240, the base station 120 can send the CSI-RS based on the indicated resources for the aperiodic CSI-RS in the subframe of the second serving cell. At 260, the base station 120 can receive, in another subframe, a message containing the requested CSI from the UE 110.

From the UE perspective, at 220, the UE 110 can receive DCI from the base station 120. The DCI can contain a CSI request on a physical control channel in a subframe of a first serving cell. The CSI request can direct the UE to perform CSI measurements for at least one aperiodic CSI-RS of a second serving cell. Receiving DCI can include receiving CSI-RS configuration information for the at least one aperiodic CSI-RS. DCI contents for determining the CSI-RS resources can be in at least one of a CSI request field and another field of a control channel. The DCI can also indicate granted resources on which the CSI is sent by the UE 110 to the base station 120. The DCI, such as DCI format 0 or other DCI format (e.g. DCI format 1A), may contain fields such as "aperiodic CSI request," "resources for transmissions," "modulation and coding scheme," and other fields. The DCI can be transmitted by the base station 120 and received by the UE 110 on control channels, such as a Physical Downlink Control Channel (PDCCH), an Enhanced PDCCH (EPDCCH), and/or other types of control channels, where the DCI can be content of the control channel. The DCI can also contain Channel State Information Interference Measurement (CSI-IM) configuration information for a CSI-IM of the serving cell and a set of resource elements used for determining CSI can be indicated by the CSI-IM configuration information.

The first serving cell can be a primary serving cell, a licensed secondary serving cell, an unlicensed secondary serving cell, and/or any other cell. The second serving cell can be a licensed secondary serving cell, an unlicensed secondary serving cell, and/or any other cell. The first and second serving cells can be the same serving cell or different serving cells. Aperiodic subframes of cells can be aperiodic in that they do not follow a specific duty cycle.

At 230, the UE 110 can ascertain CSI-RS resources in a subframe of the second serving cell based on at least the DCI contents. CSI-RS resources can include at least a set of resource elements, antenna ports, a scrambling identifier (scrambling ID), and/or other resources for a UE to measure CSI. The subframe of an ascertained CSI-RS resource may or may not be same subframe as the subframe in which the DCI is received. The ascertained CSI-RS resources in the subframe can also be based on a higher layer signaled CSI-RS configuration for aperiodic CSI-RS transmission, where the higher layer can be a layer higher than a physical layer. Higher layers can include a Radio Resource Control (RRC) layer, a Media Access Control (MAC) layer, and other layers higher than a physical layer.

At 250, the UE 110 can determine CSI based on the ascertained CSI-RS resources. At 260, the UE 110 can send the determined CSI to the base station 120.

Figure 3:
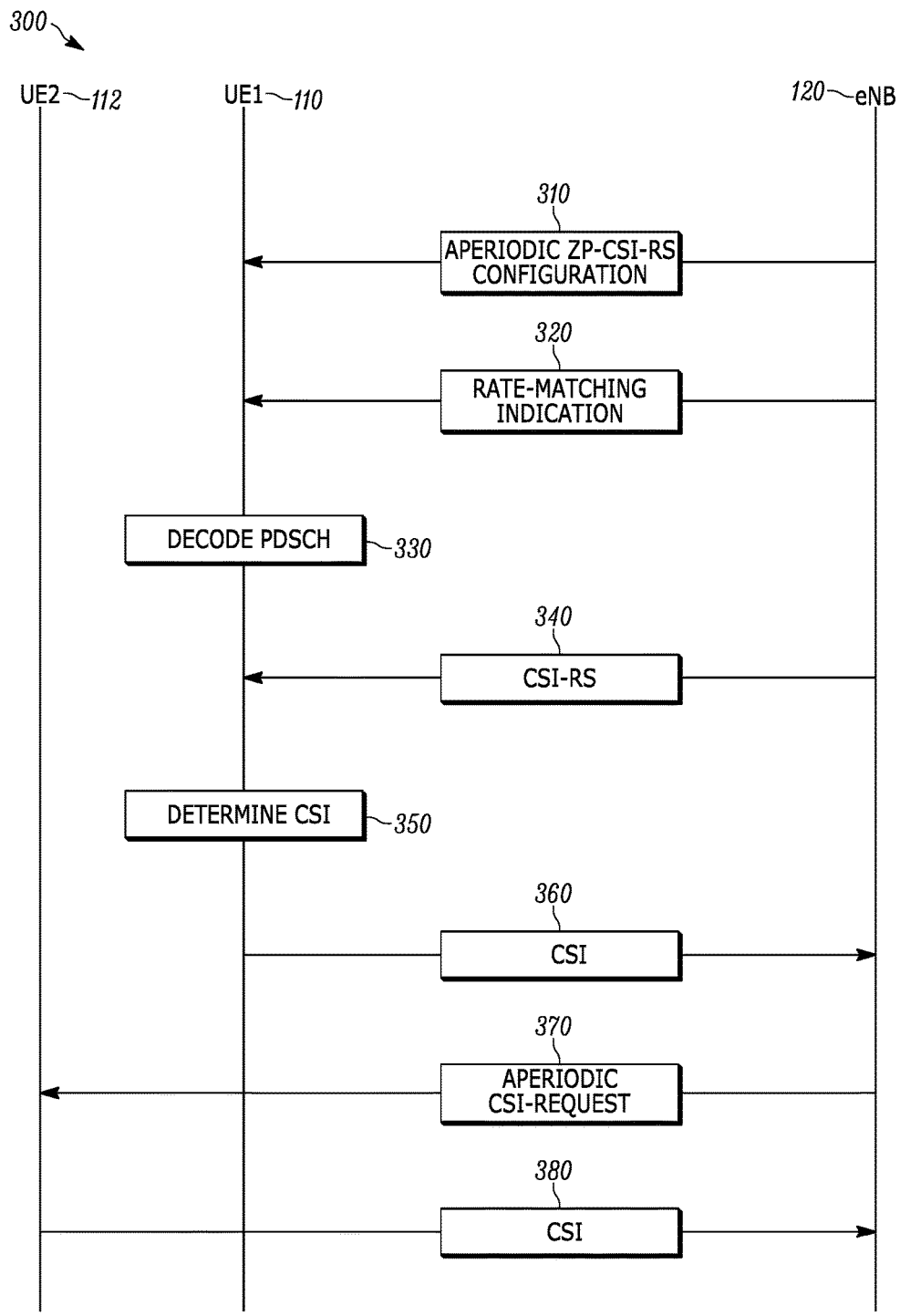
FIG. 3 is an example signal flow diagram according to a possible embodiment.

FIG. 3 is an example signal flow diagram 300 according to a possible embodiment. The signal flow diagram 300 shows signals and operations of the first UE 110, the base station 120, and the second UE 112. Signals from the signal flow diagram 300 can be performed in parallel with, sequential with, or in various orders with signals from the signal flow diagram 200.

From the first UE 110 perspective, at 310 the first UE 110 can receive ZP-CSI-RS configuration information for an aperiodic ZP-CSI-RS of a serving cell. The aperiodic ZP-CSI-RS can be at least one aperiodic ZP-CSI-RS of multiple aperiodic ZP-CSI-RS's. The ZP-CSI-RS's can be aperiodic in that they do not follow a specific duty cycle. The ZP-CSI-RS configuration information can include a bitmap, where each bit of the bitmap can correspond to a set of RE's. Each bit of the bitmap can also indicate whether a given RE corresponds to a ZP-CSI-RS. This configuration can be signaled to the UE by the eNB via higher layer signaling, such as on a Radio Resource Control (RRC) layer. For example, higher layers can include a Radio Resource Control (RRC) layer, a Media Access Control (MAC) layer, and other layers higher than a physical layer. The ZP-CSI-RS configuration information can be received in a DCI.

At 320, the first UE 110 can receive DCI on a physical control channel in a subframe of the serving cell. The DCI can indicate whether a PDSCH of the UE in the subframe of the serving cell is rate-matched around resource elements indicated by the ZP-CSI-RS configuration information. The DCI can include a field that indicates the ZP-CSI-RS configuration based on which PDSCH is rate-matched in the subframe.

At 330, the first UE 110 can decode the PDSCH in the subframe of the serving cell based on rate-matching around the resource elements indicated by the ZP-CSI-RS configuration when the DCI indicates the PDSCH of the first UE 110 is rate-matched around the resource elements indicated by the ZP-CSI-RS configuration. The subframe of the PDSCH in 330 can be the same subframe as the one in which the UE received the DCI in 320. Decoding can include receiving data on PDSCH after rate-matching around zero power RE's indicated by the ZP-CSI-RS configuration information. Rate-matching can include skipping resource elements including a ZP-CSI-RS. For example, rate-matching can include determining whether PDSCH contents are not placed in or not mapped to RE's, i.e., determining which RE's do not include PDSCH contents.

At 340, the first UE 110 can receive a CSI-RS. At 350, the first UE 110 can determine CSI based on a set of resource elements that is a subset of resource elements indicated by the ZP-CSI-RS configuration information, such as based on the CSI-RS received in the subset of resource elements. The subframe in 320 can be a first subframe and at 360, the first UE 110 can send the determined CSI in a second subframe. The first subframe and the second subframe can be sequential or can be separated by at least one intervening subframe or time period. Separating the first and second subframe can give a UE some processing time to measure the RS and report it back to an eNB on the uplink. The CSI can be computed using two components: a channel part which can be based on a Non-Zero Power CSI-RS (NZP-CSI-RS) configuration, and an interference part which can be based on a CSI-IM configuration, which can be similar to the NZP-CSI-RS configuration in structure, such as in signaling format.

From the base station 120 perspective, at 310, the base station 120 can signal a ZP-CSI-RS configuration for an aperiodic ZP-CSI-RS for the first UE 110 via at least one higher layer, where the higher layer can be higher than a physical layer. At 320, the base station 120 can indicate via a control channel to the first UE 110 in a subframe as to whether the first UE 110 rate-matches PDSCH around resource elements indicated by a ZP-CSI-RS configuration for an aperiodic ZP-CSI-RS for the first UE 110 via at least one higher layer. The base station 120 can indicate the rate-matching via a control channel of a first serving cell. The first serving cell can be a primary cell and the first UE 110 can be connected to the primary cell. At 340, the base station 120 can transmit a CSI-RS in resource elements that are subset of resource elements indicated by the ZP-CSI-RS configuration.

At 370, the base station 120 can transmit an aperiodic CSI request to a UE. The UE 112 that the base station 120 transmits the aperiodic CSI request to can be the first UE 110 and/or the second UE 112. The aperiodic CSI request can direct the first UE 110 and/or the second UE 112 to measure CSI based on resource elements in the subframe that are a subset of the ZP-CSI-RS configuration. The aperiodic CSI request can be a request for CSI for resources elements that are aperiodic, such as for aperiodic CSI-RS's. The aperiodic CSI request can direct the first UE 110 and/or the second UE 112 to measure CSI based on resource elements in a subframe of a second serving cell where the resources elements are a subset of the ZP-CSI-RS configuration. At 380, the base station 120 can receive in another subframe, a message containing the requested CSI from the first UE 110 and/or the second UE 112.

Embodiments can provide for CSI enhancements for LTE operation in unlicensed spectrum, such as for Licensed Assisted Access for LTE (LAA-LTE) so that LAA-LTE can coexist of with other unlicensed spectrum deployments and can provide physical layer options and enhancements to LTE to meet design targets and requirements.

Listen-Before-Talk (LBT) and discontinuous transmission requirements can be used for operation in unlicensed spectrum, such as 5 GHz, (e.g. used for Wi-Fi), in some countries/regions. Modifications to physical layer signaling and assumptions from a base station to a user equipment (eNB to UE), as compared to the LTE Release 12 (Rel 12) standard, can be implemented to operate LAA-LTE UEs in unlicensed spectrum with such requirements. The modifications can also help in improving LAA-LTE and Wi-Fi coexistence on the same unlicensed carrier.

In LTE operation on a licensed carrier, signals, such as synchronization signals, Cell specific Reference Signals (CRS), CSI-RS, and CSI-IM, are typically transmitted periodically, since the medium, i.e. frequency spectrum, is always assumed to be available given the operator has exclusive use of the spectrum. However, the medium on an unlicensed carrier is not always available for an LTE operator. For example, the frequency spectrum of an unlicensed carrier, such as the spectrum used for Wi-Fi, can be shared with other users. The physical layer design of LTE can be adapted so that it can work on a medium that may be available for discontinuous time-periods and/or a medium that may not be with the same periodicity as that for LTE operation on a licensed carrier.

For instance, for supplemental downlink using LTE in unlicensed spectrum, such as 5 GHz spectrum, where medium access is based on LBT, in some situations an eNB should perform a clear-channel assessment, such as energy detection, according to some requirements, such as regulatory, Clear Channel Assessment (CCA) per IEEE 802.11 standard, and/or other requirements, to detect if the medium is free. If the eNB detects that medium is free, then the eNB can start transmitting signals according to an LTE format, such as using an LTE subframe structure, for some amount of time, such as a few milliseconds, before it has to give up the medium and/or perform another CCA for accessing the medium.

Multiple techniques can be employed to use LTE in unlicensed spectrum. According to one technique, for LTE Rel10-12 Carrier Aggregation (CA) or dual connectivity, the eNB can configure a Secondary serving cell (Scell) to the UE to provide additional frequency resources, such as a secondary carrier or a secondary Component Carrier (CC), for communication in addition to a Primary serving cell (Pcell). For a UE, the unlicensed carrier can be utilized as a Scell in the carrier aggregation context, where the Pcell can be operating on a licensed carrier, where both cross-carrier and same-carrier scheduling could be supported for the Scell. For convenience, a Scell operating in unlicensed carrier can be denoted as Scell-u. According to another technique, the Scell-u can be aligned substantially in the time domain with another cell, such as a Scell or a Pcell, at radio frame and subframe level. According to another technique, the eNB can perform CCA to determine when the medium is free. If it determines the medium is free, then it can transmit LTE signals on the Scell-u.

According to another technique, the UE may be using discovery signals for Radio Resource Management (RRM) measurements and reporting the measurements on the unlicensed carrier, such as the corresponding to Scell-u. Since discovery signals can occur with sparse periodicity, it may be assumed that the discovery signals are always transmitted on an unlicensed carrier. For example, the discovery signals may not be subject to the LBT limitation. Alternatively, if the medium is not available at a particular discovery signal occasion, the corresponding discovery signals may be moved in time to a suitable time interval where the medium is available.

According to another technique, the eNB may need to create guard intervals, such as of <1 Orthogonal Frequency Division Multiplex (OFDM) symbol (which is typically around 70 microseconds), in its downlink transmissions to the UEs. Since CCA duration can be ~20 us, a guard period of 1 OFDM symbol of duration 70 us per current LTE frame structure may be useful to support CCA. This can be achieved by creating shortened downlink subframes for UEs. For example, for Time Division Duplex (TDD) operation on a Scell-u, shortened uplink subframes may be required, which can be achieved using a fake Sounding Reference Signal (SRS) symbol, such as by configuring the last symbol of the subframe as a SRS symbol instead of a CCA. Single symbol guard intervals occurring at the beginning of a subframe can be possible using cross-carrier scheduling, and using pdschStartSymbol=1 signaling for the unlicensed carrier, assuming a subframe starts with symbol 0 numbering for the first symbol in the subframe. Single symbol guard intervals occurring at the beginning of a subframe can be possible using self-carrier scheduling, Enhanced Physical Downlink Control Channel (EPDCCH), and using epdcchStartSymbol>=1 signaling for the unlicensed carrier. For single symbol guard intervals occurring at the end of the subframe, the downlink subframe can be shortened and special subframe formats, such as defined for TDD, can be used to create guard intervals in the downlink subframes.

According to another technique, it may be useful to have the eNB may create guard intervals of length 1 ms or higher in its downlink transmissions to the UEs. The guard interval can serve several purposes, such as to allow eNB to release the medium for a few subframes to meet the channel occupancy requirements per the LBT specification, etc., and such as to allow eNB energy savings, interference reduction, etc. The UE can be oblivious to the exact purpose of what the guard period is used for. This technique can use subframe-level ON/OFF for a UE that is in activated state on the Scell.

According to another technique, for subframe-level ON/OFF, in the activated state, the multiple aspects can be considered. According to one aspect, for Primary Synchronization Channel (PSS)/Secondary Synchronization Channel (SSS), given overhead is small, a UE may assume that the REs corresponding to PSS/SSS are always occupied irrespective of whether the subframe is ON or OFF. Another option is to always assume that PSS/SSS, except for those PSS/SSS that occur in Discovery signals is not transmitted for Scells. Another option is for the UE in activated state to assume PSS/SSS is transmitted in predetermined synchronization subframes, such as subframe 0, 5 for Frequency Division Duplex (FDD), subframe 1, 6 for TDD, etc., only if a DCI format (PDCCH/EPDCCH) is detected or PDSCH scheduled in that subframe. According to another aspect, for Cell-specific Reference Signal (CRS), if a UE detects and finds a PDCCH/EPDCCH/PDSCH for the Scell in a subframe, the UE can assume the subframe is not OFF, such as assume a CRS is present in the subframe. Otherwise, the UE can assume that CRS is not present in the subframe. According to another aspect, a discovery signal may be always transmitted irrespective of ON/OFF status of a subframe. Alternately, if the medium is busy, the discovery signal occasion can be moved to the nearest time duration when medium is available. Aperiodic discovery signal scheduling can be possible. A discovery signal occasion can include a burst of PSS/SSS+CRS+CSI-RS every M milliseconds, where M can be 40, 80 or 160. According to another aspect, for (E)PDCCH, a UE can blindly detect, or monitor a set of (E)PDCCH candidates, every subframe on the Scell to detect DCI. If the UE detects DCI in a subframe, the UE can follow the DCI, and assume that the subframe is not OFF. According to another aspect, for PDSCH, if the UE detects DCI scheduling PDSCH in the Scell in a subframe, the UE can follow the DCI, and assume that the corresponding Scell subframe is not OFF. The DCI may come from self-scheduling or cross-carrier scheduling.

An issue can still remain on how to handle Channel State Information Reference Signal CSI-RS transmissions and CSI reporting based on CSI-RS.

One option to handle CSI-RS transmission for activated Scell ON/OFF operation on a Scell-u can use a current periodic CSI-RS structure for CSI transmission and the eNB can occasionally drop CSI-RS in a subframe if the medium is not available. The UE can have multiple choices to report CSI.

One way the UE can report CSI is to measure and report CSI assuming that CSI-RS is always present periodically on the unlicensed carrier. In this case, the UE may be measuring and reporting just "noise" if the Scell is off In this case, averaging measurements across multiple CSI-RS occasions may not be used. Also, an ON/OFF Indicator or ON/OFF detection may not be required.

Figure 4:
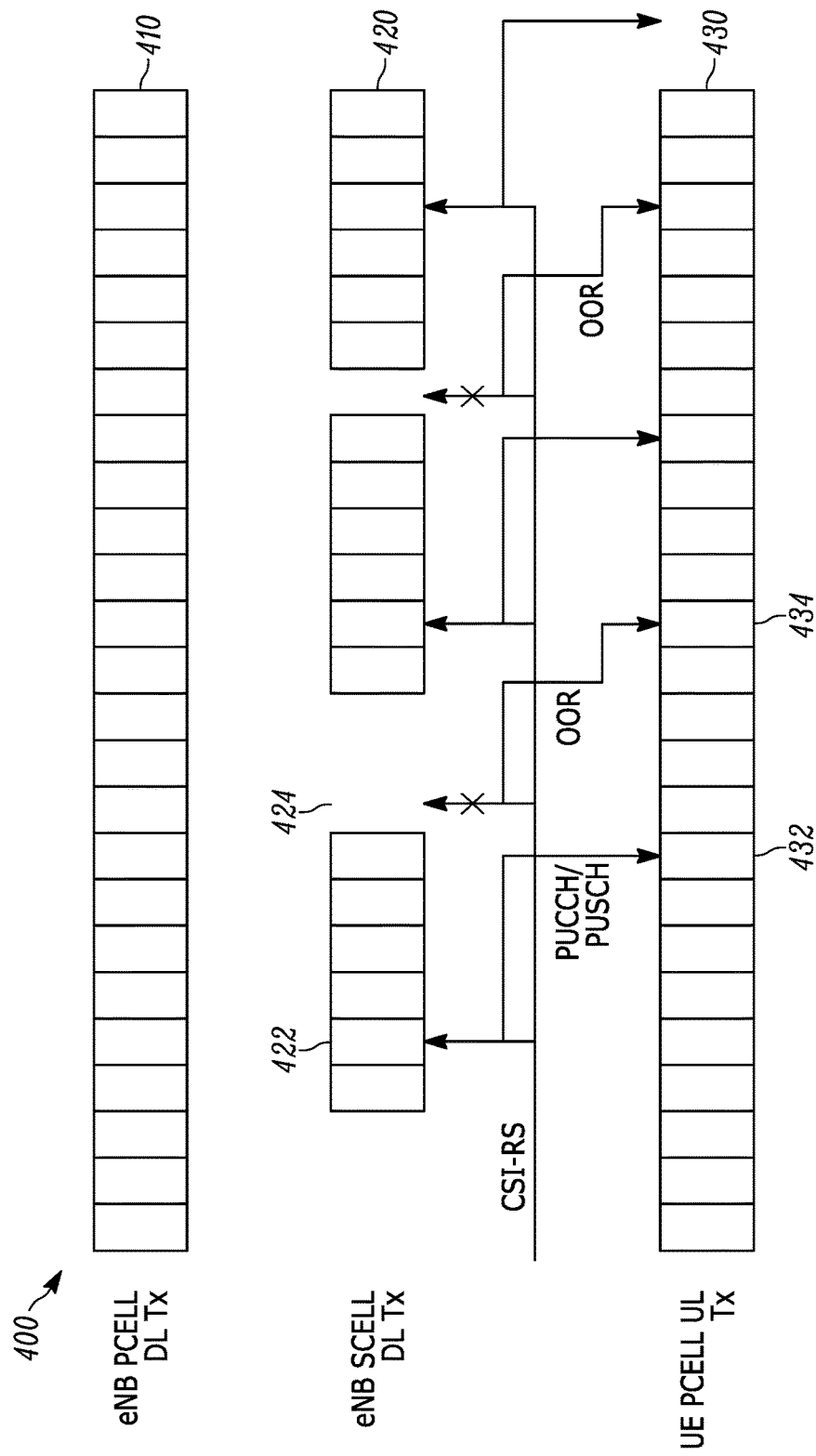
FIG. 4 is an example illustration of subframes of a way a user equipment can report channel state information according to a possible embodiment.

FIG. 4 is an example illustration of subframes 400 of another way a UE can report CSI according to a possible embodiment. The subframes 400 can include subframes 410 transmitted in a downlink by an eNB Pcell, subframes 420 transmitted in a downlink by an eNB Scell, and subframes 430 transmitted in an uplink by a UE. The subframes 420 can be transmitted in a downlink by an unlicensed eNB Scell. In this embodiment, the UE can measure and report CSI assuming CSI-RS is present only in ON subframes, such as subframe 422, and use the CSI-RS of a most recent ON subframe to report CSI in a given uplink subframe 432. In this embodiment, an ON/OFF Indicator or ON/OFF detection required may be required. The UE can report CSI assuming CSI-RS is present only in ON subframes. If the most recent subframe configured for CSI-RS is an OFF subframe 424, the UE can report Out-Of-Range (OOR) in a given uplink subframe 434. In this case, an ON/OFF Indicator or ON/OFF detection may be required. This case may result in extra transmissions from the UE on a PUCCH from OOR transmissions. The UE can report out-of-range indicator with the smallest rank value to reduce uplink payload.

To improve the 'ON/OFF indication' approach, a maximum frame duration can be configured and known to the UE. The maximum frame duration can be the longest duration that the eNB can hold the medium. The eNB can send an 'ON' indication via PCell when it acquires the channel UE can then start to measure and report CSI per configuration. After the maximum frame duration, the UE can stop measuring and reporting CSI. The UE can then wait until it sees another ON indication. If another ON indication is seen while the UE is measuring and reporting, a maximum frame duration timer can be reset, such as to the maximum frame duration. If the eNB or Scell goes to OFF state early, the UE can continue measuring and reporting CSI, which would not pose a problem. This approach can make it unnecessary to send ON/OFF indications every subframe. Only ON indications may be needed and only when the eNB acquires/reacquires the medium.

Figure 5:
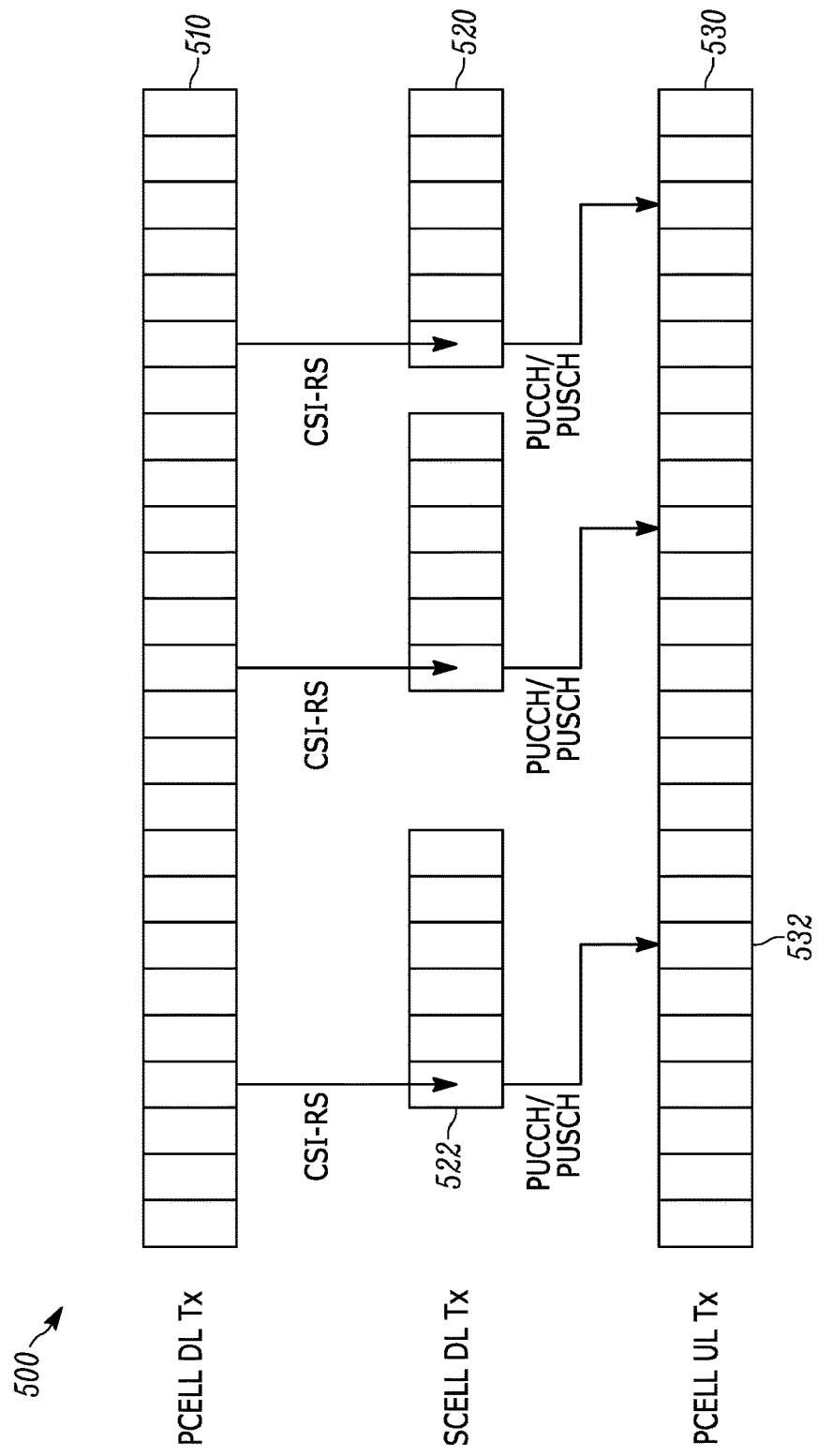
FIG. 5 is an example illustration of subframes of another way a user equipment can report channel state information according to a possible embodiment.

FIG. 5 is an example illustration of subframes 500 of another way a UE can report CSI according to a possible embodiment. The subframes 500 can include subframes 510 transmitted in a downlink by an eNB Pcell, subframes 520 transmitted in a downlink by an eNB Scell, and subframes 530 transmitted in an uplink by a UE. The subframes 520 can be transmitted in a downlink by an unlicensed eNB Scell.

This option for handling CSI-RS transmission for activated Scell ON/OFF operation on a Scell-u can use an aperiodic CSI-RS structure for CSI where the CSI-RS can be dynamically scheduled, such as via a Pcell and using cross-carrier scheduling. This option can relate to the signal flow diagram 200. A corresponding CSI reporting grant can be a broadcast grant so that multiple UEs can measure CSI-RS and report the CSI according to their respective periodic/aperiodic CSI reporting schedule. The subframe 522 in which the CSI-RS is received can be considered to be the "reference" subframe for CSI measurement, and the CSI can be reported in a subframe 532 on a PUCCH or a Physical Uplink Shared Channel (PUSCH). An aperiodic CSI request may also be sent by an eNB to request the CSI aperiodically. According to a possible implementation, an aperiodic CSI request including a request of CSI for an Scell can be an indicator that CSI-RS is present on the SCell subframe including the control channel in which the CSI request is sent.

Figure 6:
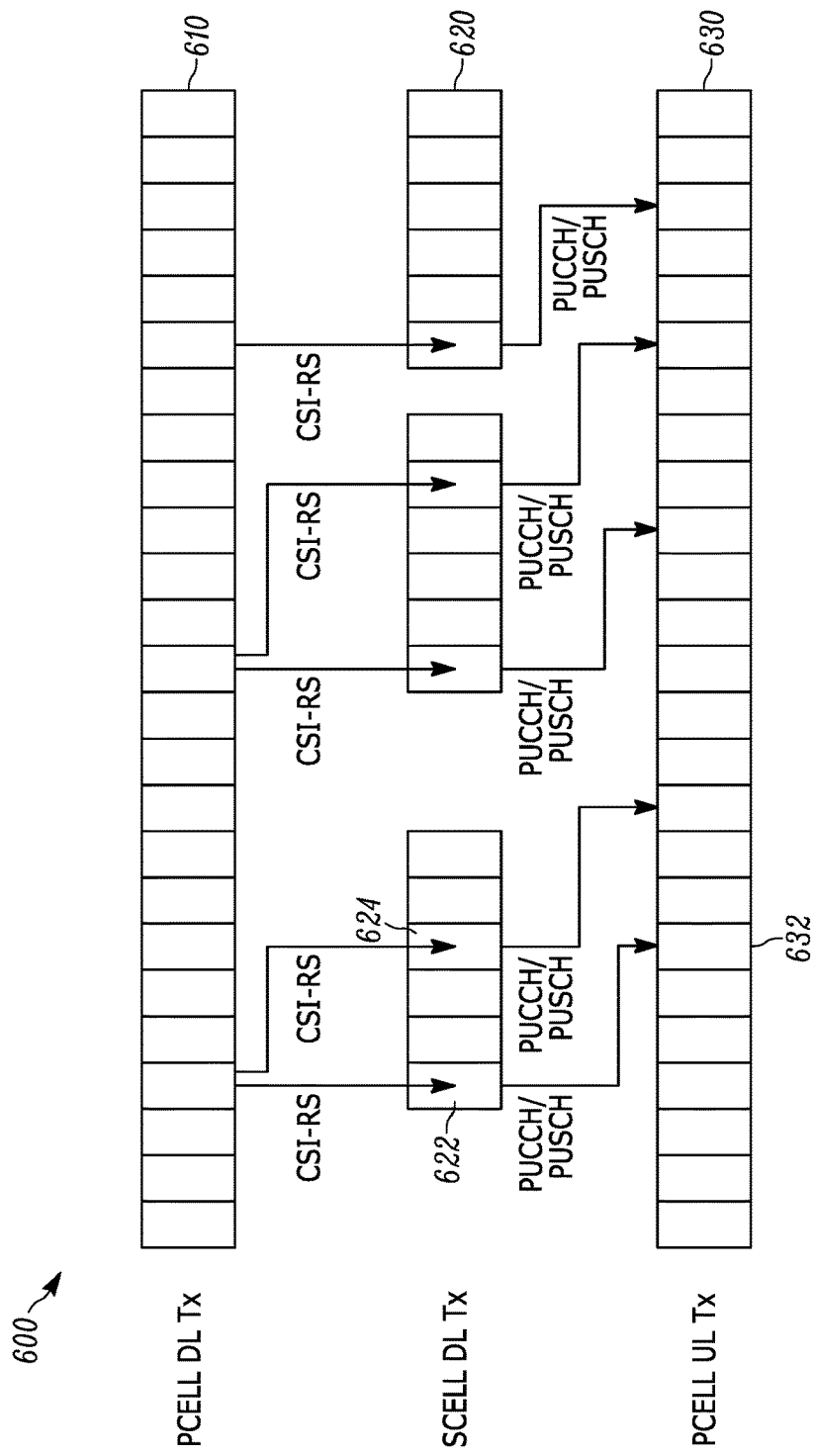
FIG. 6 is an example illustration of subframes of another way a user equipment can report channel state information according to a possible embodiment.

FIG. 6 is an example illustration of subframes 600 of another way a UE can report CSI according to a possible embodiment similar to the previous embodiment. The subframes 600 can include subframes 610 transmitted in a downlink by an eNB Pcell, subframes 620 transmitted in a downlink by an eNB Scell, and subframes 630 transmitted in an uplink by a UE. The subframes 620 can be transmitted in a downlink by an unlicensed eNB Scell. This option for handling CSI-RS transmission for activated Scell ON/OFF operation on a Scell-u can use aperiodic CSI-RS structure for CSI, where the CSI-RS can be dynamically scheduled, such as via a Pcell and using cross-carrier scheduling with some validity/expiry timer. The grant can be a broadcast grant so that multiple UEs can measure CSI-RS and report according to their respective periodic CSI reporting schedule. This can allow an eNB to allow the CSI reports to be aligned with medium access boundaries. For instance, the eNB may request the UE to measure CSI in the last subframe of the current medium access so that the eNB has some knowledge when it regains medium access in the next attempt. The reference subframes for CSI measurements can be the subframes 622 and 624 in which the CSI-RS is received, and the CSI may be reported on the PUCCH or PUSCH 632. An aperiodic CSI request may also be sent by the eNB to request the CSI aperiodically.

For unlicensed carriers, aperiodic CSI-RS can be scheduled for the UE in the first subframe that begins after the medium is available. Several options can be used to provide aperiodic CSI-RS transmission and reporting aperiodic CSI based on aperiodic CSI-RS transmission. According to a possible option, higher layers indicate number of CSI-RS antenna ports, resources (REs) and/or a power setting, such as the absence of subframe-offset and periodicity, for one or more CSI-RS configuration, such as one or more CSI-RS resource configuration and one or more CSI-IM resource configuration corresponding to one or more CSI processes and/or CSI subframe sets. This CSI-RS configuration can differ from the Rel-11/12 CSI-RS configuration for CSI reporting in that this CSI-RS configuration can indicate an aperiodic CSI-RS transmission, such as due to absence of subframe-offset and/or periodicity. According to another possible option, a separate aperiodic CSI reporting grant with its own Cyclic Redundancy Check (CRC), such as a CSI-Radio Network Temporary Identifier (CSI-RNTI), can be used for CSI-RS transmissions. The grant can explicitly indicate the CSI-RS resource and the uplink resources, such as Resource Blocks (RBs), on which the CSI feedback is transmitted. The grant may be transmitted on the Pcell or Scell-u. According to another possible option, an aperiodic CSI-RS transmission message, such as sent on physical control channel, can indicate whether a subframe contains the CSI-RS. According to another possible option, an aperiodic CSI-RS transmission message, such as sent on physical control channel, can indicate the subframes in which CSI-RS is transmitted. The message may be valid only for a certain number of subframes, such as 10 subframes, and may indicate a subframe subset, such as subframe 0, 4, 8, that can have CSI-RS within a limited time period. This message can refer to CSI-RS in multiple subframes. According to another possible option, the CSI-RS configuration can also include separate channel measurement RS and interference measurement resources. According to another possible option, when sending a CQI based on measuring a desired signal and interfering signal, the RE's on which the desired signal is retrieved can be different than the RE's on which the interference is measured.

For the timing between the transmission of aperiodic CSI request and corresponding CSI-RS transmission/measurement subframe, an aperiodic CSI request DCI for an Scell-u received in subframe n can imply various types of information to a UE. For example, it can imply that subframe n contains CSI-RS for Scell-u, where the CSI-RS configuration can be a new Rel-13 CSI-RS configuration indicated by higher layers that includes RE's, antenna ports, and/or a power setting, such as an absence of subframe-offset and periodicity.

An aperiodic CSI request DCI for an Scell-u received in subframe n can also imply that subframe n contains CSI-RS according to a CSI-RS configuration X, where the CSI-RS configuration X can be selected from a set of new Rel-13 CSI-RS configurations configured by higher layers that include includes RE's, antenna ports, and/or a power setting, such as the absence of subframe-offset and periodicity. The configuration X can be indicated in the DCI requesting the aperiodic CSI-RS request. For example, two bits in DCI can be used to signal one of four CSI-RS configurations including no aperiodic CSI trigger, such as shown in Table 1.

TABLE 1

CSI-RS Indicator field for aperiodic CSI-RS configuration

| Value of CSI-RS Indicator field | Description |
| --- | --- |
| '00' | No aperiodic CSI report is triggered |
| '01' | Aperiodic CSI report is triggered for a 1st CSI-RS configuration for serving cell u |
| '10' | Aperiodic CSI report is triggered for a 2nd set of CSI-RS configuration for serving cell u |
| '11' | Aperiodic CSI report is triggered for a 3rd set of CSI-RS configuration for serving cell u |

The CSI-RS configuration can also include separate channel measurement CSI-RS and interference measurement resources.

Besides aperiodic CSI request in uplink DCI format and Random Access Response (RAR) grants that are supported in LTE, the aperiodic CSI request can be triggered from DCI formats used for Downlink (DL) data scheduling on Scell-u in a subframe. The aperiodic CSI report can be triggered for a set of CSI process(es) and/or {CSI process, CSI subframe set}-pair(s) configured by higher layers for serving cell u and can be reported on a higher-layer configured uplink resource according to a higher-layer configured CSI-RS configuration in the subframe. Two bits in DCI may be used to signal whether aperiodic CSI is triggered and selecting one of three uplink resources configured by higher layers, such as according to the mapping in Table 2.

TABLE 2

CSI request field and Physical Uplink Shared Channel (PUSCH) resource for Aperiodic CSI (can be extra with Table 1).

| Value of CSI request field | Description |
| --- | --- |
| '00' | No aperiodic CSI report is triggered |
| '01' | Aperiodic CSI report is triggered for a set of CSI process(es) and/or {CSI process, CSI subframe set}-pair(s) configured by higher layers for serving cell c and on a first PUSCH resource configured by the higher layers |
| '10' | Aperiodic CSI report is triggered for a set of CSI process(es) and/or {CSI process, CSI subframe set}-pair(s) configured by higher layers for serving cell c and on a second PUSCH resource configured by the higher layers |
| '11' | Aperiodic CSI report is triggered for a set of CSI process(es) and/or {CSI process, CSI subframe set}-pair(s) configured by higher layers for serving cell c and on a third PUSCH resource configured by the higher layers |

The dynamic resource configuration of CSI-RS described in Table 1 can be combined with the dynamic uplink resource configuration in Table 2, for example, as a separate bit-field or a jointly-encoded bit-field.

A possible embodiment can provide a Zero Power-CSI-RS (ZP-CSI-RS) indicator in DCI formats for downlink transmission modes 1 to 10, TM1-10. A UE may be configured by higher layers in one out of the various transmission modes. Each transmission mode has associated set of DCI formats and PDSCH transmission scheme/schemes, such as single antenna port transmission based on CRS, transmit diversity based on CRS, open loop MIMO based on CRS, closed loop MIMO based on CRS, closed loop MIMO based on UE-specific demodulation reference signals, etc. This embodiment can relate to the signal flow diagram 200. For example, whenever CSI-RS is scheduled aperiodically in a subframe, it can also be useful to ensure that UEs can receive data in that subframe irrespective of whether an aperiodic CSI request is triggered for a given UE. This can imply that the Physical Downlink Shared Channel (PDSCH) should be rate-matched around the aperiodic CSI-RS. This can be done by creating a new dynamic ZP-CSI-RS indicator field that is sent via DCI formats used for DL data scheduling in all transmission modes. For TM10, which corresponds to PDSCH based on UE-specific DMRS, this can be achieved by adding another ZP-CSI-RS indicator field in the DCI formats used for DL data scheduling or by adding a Rel-13 ZP-CSI-RS indicator to the PDSCH Rate Matching and QuasiCoLocation Indicator (PQI) fields in DCI format 2D. Example values of the indicator field and corresponding descriptions are shown in Table 3. TM10 is defined typically for supporting coordinated multipoint transmission, using PDSCH transmission schemes based on UE-specific DMRS.

TABLE 3

Dynamic ZP-CSI-RS Rate-matching parameter.

| Value of ZP-CSI-RS indicator field | Description |
| --- | --- |
| '00' | No additional ZP-CSI-RS REs indicated by the DCI |
| '01' | PDSCH is rate-matched around first set of dynamic ZP-CSI-RS REs in the subframe |
| '10' | PDSCH is rate-matched around second set of dynamic ZP-CSI-RS REs in the subframe |
| '11' | PDSCH is rate-matched around third set of dynamic ZP-CSI-RS REs in the subframe |

Rate matching can mean skipping the ZP-CSI-RS RE's for data, but measuring the CSI-RS if instructed to.

For PDSCH demodulation in TM10, the antenna port(s) on which a Demodulation Reference Signal (DMRS) are transmitted is assumed to be quasi co-located with CSI-RS antenna ports, such as the antenna port on which CSI-RS is transmitted, corresponding to an indicated CSI-RS resource configuration. An antenna port can be defined such that the channel over which a symbol on the antenna port is conveyed can be inferred from the channel over which another symbol on the same antenna port is conveyed. Two antenna ports can be said to be quasi co-located if the large-scale properties of the channel over which a symbol on one antenna port is conveyed can be inferred from the channel over which a symbol on the other antenna port is conveyed. The large-scale properties can include one or more of delay spread, Doppler spread, Doppler shift, average gain, and average delay.

If CSI-RS is transmitted aperiodically, then other than CSI feedback, CSI-RS signals can also be used for quasi-colocation purposes, such as for determining the large scale properties of the channel In this case, there it can be useful to use an explicit indication of CSI-RS transmissions. The CSI-RS resource configuration can be indicated for quasi-colocation with Demodulation Reference Signal (DM-RS). The UE can use measurements on one or more CSI-RS corresponding to previous aperiodic CSI request triggers associated with the indicated CSI-RS configuration for quasi co-location purposes. The UE can be configured to assume that one or more of the antenna port(s) corresponding to the CSI-RS resource configuration(s) as part of the discovery signals, such as within the discovery signal occasion for the cell, for which the UE can assume non-zero transmission power for the CSI-RS and the DM-RS antenna ports associated with the PDSCH are quasi co-located. Alternatively, or in addition, the UE can be configured to assume that the CRS antenna port transmission as part of the discovery signals within the discovery signal occasion for the cell and the DM-RS antenna ports associated with the PDSCH are quasi co-located.

The following Quasi-Co-Location (QCL) indicator relationship can be used for PDSCH based on TM10 in Rel-11 where ↔ can indicate that the corresponding antenna ports are quasi co-located:

DMRS ↔ periodic CSI-RS resource ↔ periodic CRS (cell-ID, Number of antenna ports, MBSFN pattern, etc).

If both CSI-RS and CRS are sparse, such as transmitted aperiodically, then the QCL relationship can be:

DMRS ↔ aperiodic CSI-RS resource ↔ Discovery signal (or a subset CRS/CSI-RS of the discovery signal).

Figure 7:
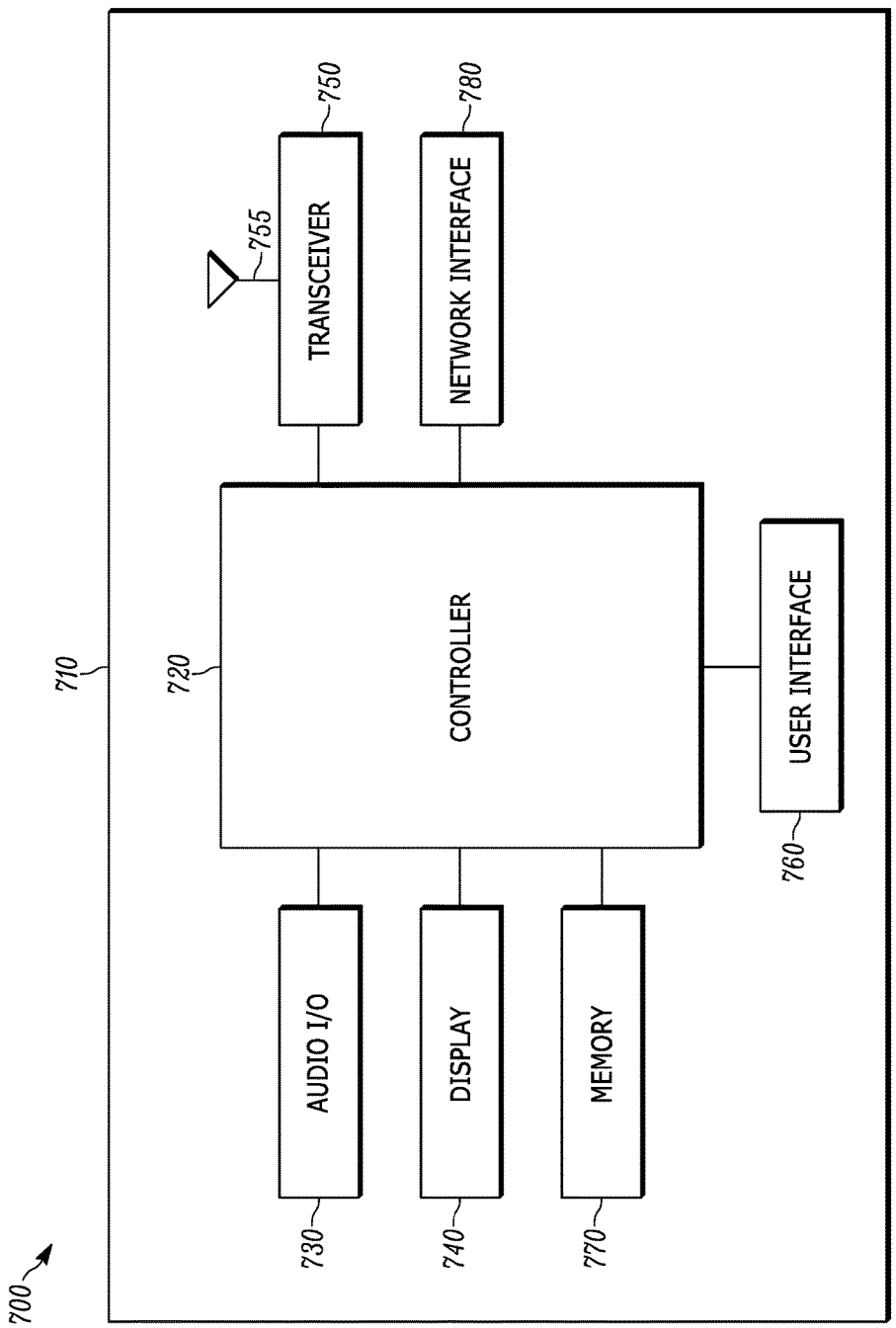
FIG. 7 is an example block diagram of an apparatus according to a possible embodiment.

FIG. 7 is an example block diagram of an apparatus 700, such as the UE 110 or the UE 112, according to a possible embodiment. The apparatus 700 can include a housing 710, a controller 720 within the housing 710, audio input and output circuitry 730 coupled to the controller 720, a display 740 coupled to the controller 720, a transceiver 750 coupled to the controller 720, an antenna 755 coupled to the transceiver 750, a user interface 760 coupled to the controller 720, a memory 770 coupled to the controller 720, and a network interface 780 coupled to the controller 720. The apparatus 700 can perform the methods described in all the embodiments.

The display 740 can be a viewfinder, a liquid crystal display (LCD), a light emitting diode (LED) display, a plasma display, a projection display, a touch screen, or any other device that displays information. The transceiver 750 can include a transmitter and/or a receiver. The audio input and output circuitry 730 can include a microphone, a speaker, a transducer, or any other audio input and output circuitry. The user interface 760 can include a keypad, a keyboard, buttons, a touch pad, a joystick, a touch screen display, another additional display, or any other device useful for providing an interface between a user and an electronic device. The network interface 780 can be a universal serial bus port, an Ethernet port, an infrared transmitter/receiver, a USB port, an IEEE 1397 port, a WLAN transceiver, or any other interface that can connect an apparatus to a network or computer and that can transmit and receive data communication signals. The memory 770 can include a random access memory, a read only memory, an optical memory, a flash memory, a removable memory, a hard drive, a cache, or any other memory that can be coupled to a wireless communication device.

The apparatus 700 or the controller 720 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 770 or elsewhere on the apparatus 700. The apparatus 700 or the controller 720 may also use hardware to implement disclosed operations. For example, the controller 720 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 720 may be any controller or processor device or devices capable of operating an electronic device and implementing the disclosed embodiments.

In operation, the transceiver 750 can receive DCI containing a CSI request on a physical control channel in a subframe of a first serving cell. The CSI request can direct the apparatus 700 to perform CSI measurements for at least one aperiodic CSI-RS of a second serving cell. The DCI can also indicate granted resources on which the CSI is sent by the apparatus 700 to the base station. The controller 720 can ascertain CSI-RS resources in a subframe of the second serving cell based on at least the DCI contents and configured to determine CSI based on the ascertained CSI-RS resources. The transceiver 750 can send the determined CSI to a base station.

According to another possible embodiment, the transceiver 750 can receive ZP-CSI-RS configuration information for an aperiodic ZP-CSI-RS of a serving cell. The transceiver 750 can also receive DCI on a physical control channel in a subframe of the serving cell. The DCI can indicate whether a PDSCH of the UE in the subframe of the serving cell is rate-matched around resource elements indicated by the ZP-CSI-RS configuration information. The controller 720 can decode the PDSCH in the subframe of the serving cell based on rate-matching around the resource elements indicated by the ZP-CSI-RS configuration when the DCI indicates the PDSCH of the UE is rate-matched around the resource elements indicated by the ZP-CSI-RS configuration.

Figure 8:
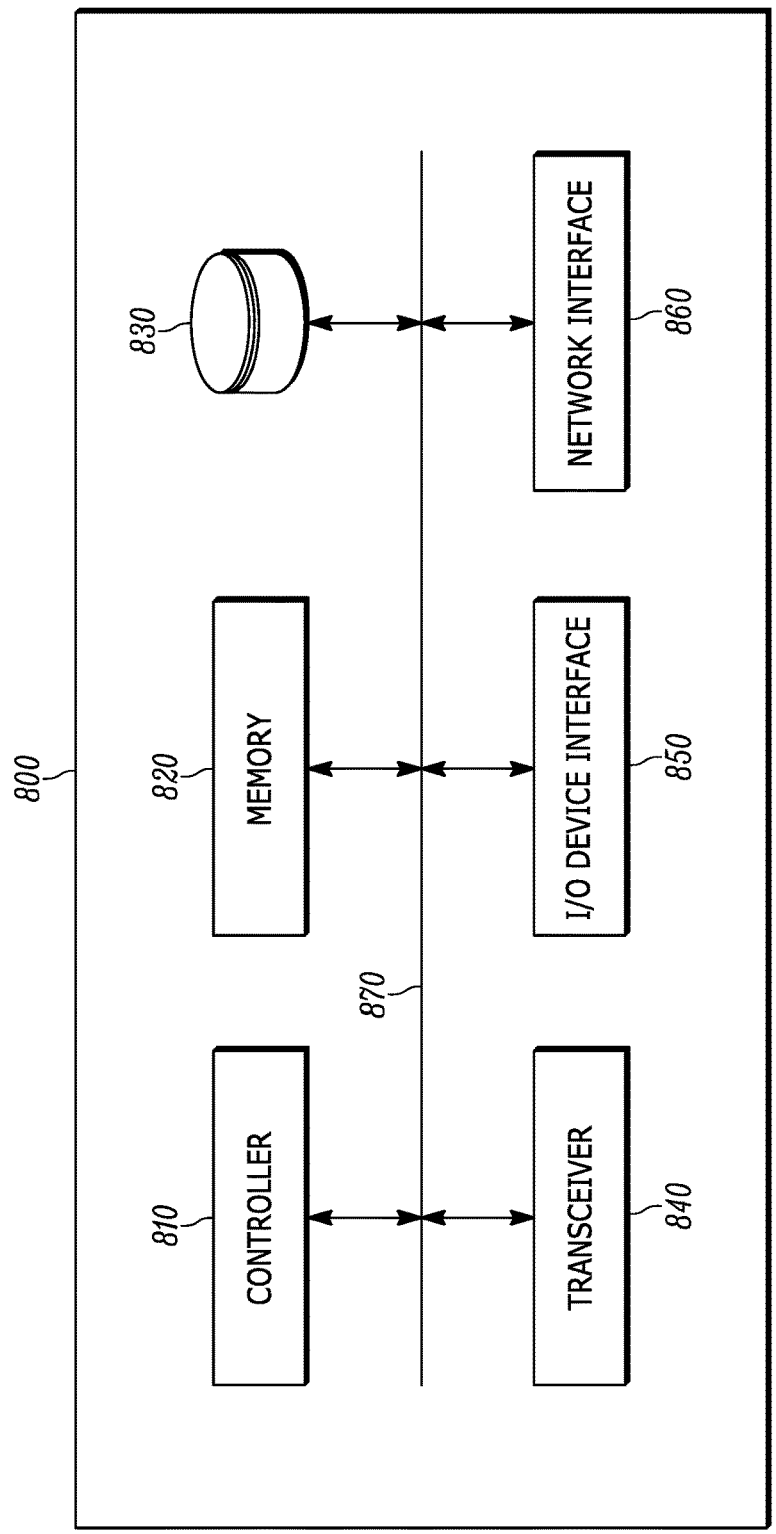
FIG. 8 is an example block diagram of a base station according to a possible embodiment.

FIG. 8 is an example block diagram of a base station 800, such as the eNB 120, according to a possible embodiment. The base station 800 may include a controller 810, a memory 820, a database interface 830, a transceiver 840, Input/Output (I/O) device interface 850, a network interface 860, and a bus 870. The base station 800 can implement any operating system, such as Microsoft Windows®, UNIX, or LINUX, for example. Base station operation software may be written in any programming language, such as C, C++, Java or Visual Basic, for example. The base station software can run on an application framework, such as, for example, a Java® server, a .NET® framework, or any other application framework.

The transceiver 840 can create a data connection with the UE 110. The controller 810 can be any programmable processor. Disclosed embodiments can also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 810 can be any controller or processor device or devices capable of operating a base station and implementing the disclosed embodiments.

The memory 820 can include volatile and nonvolatile data storage, including one or more electrical, magnetic, or optical memories, such as a Random Access Memory (RAM), cache, hard drive, or other memory device. The memory 820 can have a cache to speed access to specific data. The memory 820 can also be connected to a Compact Disc-Read Only Memory (CD-ROM), Digital Video Disc-Read Only memory (DVD-ROM), DVD read write input, tape drive, thumb drive, or other removable memory device that allows media content to be directly uploaded into a system. Data can be stored in the memory 820 or in a separate database. For example, the database interface 830 can be used by the controller 810 to access the database. The database can contain any formatting data to connect the terminal 110 to the network 130.

The I/O device interface 850 can be connected to one or more input and output devices that may include a keyboard, a mouse, a touch screen, a monitor, a microphone, a voice-recognition device, a speaker, a printer, a disk drive, or any other device or combination of devices that accept input and/or provide output. The I/O device interface 850 can receive a data task or connection criteria from a network administrator. The network connection interface 860 can be connected to a communication device, modem, network interface card, a transceiver, or any other device capable of transmitting and receiving signals to and from the network 130. The components of the base station 800 can be connected via the bus 870, may be linked wirelessly, or may be otherwise connected.

Although not required, embodiments can be implemented using computer-executable instructions, such as program modules, being executed by an electronic device, such as a general purpose computer. Generally, program modules can include routine programs, objects, components, data structures, and other program modules that perform particular tasks or implement particular abstract data types. The program modules may be software-based and/or may be hardware-based. For example, the program modules may be stored on computer readable storage media, such as hardware discs, flash drives, optical drives, solid state drives, CD-ROM media, thumb drives, and other computer readable storage media that provide non-transitory storage aside from a transitory propagating signal. Moreover, embodiments may be practiced in network computing environments with many types of computer system configurations, including personal computers, hand-held devices, multi-processor systems, microprocessor-based or programmable consumer electronics, network personal computers, minicomputers, mainframe computers, and other computing environments.

In operation, the controller 810 can control operations of the apparatus 800. The transceiver 840 can transmit, to a UE, DCI containing a CSI request on a physical control channel in a subframe of a first serving cell. The CSI request can direct the UE to perform CSI measurements for at least one aperiodic CSI-RS of a second serving cell. The DCI can include an indication of resources for the aperiodic CSI-RS in a subframe of the second serving cell. The transceiver 840 can receive, from the UE, in another subframe, a message containing the requested CSI. The controller 810 can also perform a LBT procedure to determine if a carrier is clear for a carrier frequency corresponding to the second serving cell prior to sending the aperiodic CSI-RS on the second serving cell.

In operation according to another possible embodiment, the transceiver 840 can signal a ZP-CSI-RS configuration for an aperiodic ZP-CSI-RS for a first UE via at least one higher layer, where the higher layer can be higher than a physical layer. The transceiver 840 can indicate via a control channel to the first UE in a subframe as to whether the first UE rate-matches PDSCH around resource elements indicated by a ZP-CSI-RS configuration for an aperiodic ZP-CSI-RS for the first UE via at least one higher layer. The transceiver 840 can transmit a CSI-RS in resource elements that are subset of resource elements indicated by the ZP-CSI-RS configuration. The transceiver 840 can transmit an aperiodic CSI request to a UE, the aperiodic CSI request directing the UE to measure CSI based on resource elements in the subframe that are a subset of the ZP-CSI-RS configuration, where the UE in this step can be the original UE or a different UE in earlier steps.

Figure 9:
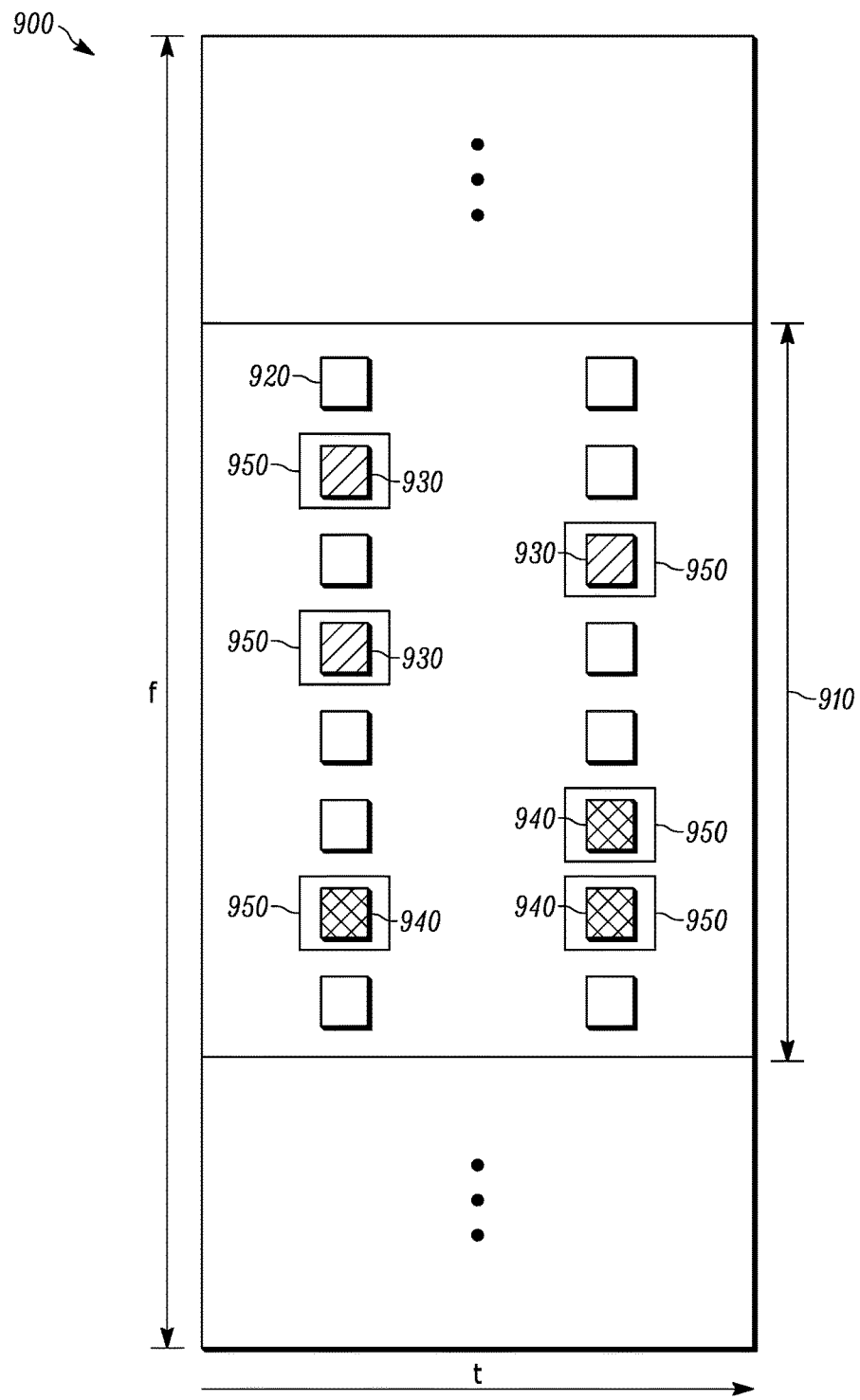
FIG. 9 is an example illustration of a subframe according to a possible embodiment.

FIG. 9 is an example illustration of a subframe 900 according to a possible embodiment. The subframe 900 can include at least one resource block 910 including a plurality of resource elements 920. The subframe 900 can include resource elements 930 of a first CSI-RS configuration. The subframe 900 can include resource elements 940 of a first CSI-RS configuration. The subframe 900 can also include resource elements 950 indicated by a ZP-CSI-RS configuration. It should be noted that the subframe 900 only shows resource elements for CSI-RS configurations and ZP-CSI-RS configurations for conceptual purposes and understanding of concepts of the disclosed embodiments and does not necessarily represent an actual subframe, resource elements, CSI-RS configurations, and ZP-CSI-RS configurations.

Embodiments can provide for a base station that dynamically schedules CSI-RS in a subframe for a UE. According to some embodiments a UE can receive, from a base station, an aperiodic CSI request on a control channel in a subframe requesting CSI feedback for a serving cell. The UE can determine the CSI-RS resources in the subframe based on the control channel contents. The UE can determine CSI information based on the determined CSI-RS resources. The UE can then send the CSI information to the base station.

According to some embodiments, a base station can configure an aperiodic ZP-CSI-RS configuration and subframe offset for a UE via higher layers than a physical layer. The base station can indicate to the UE in a subframe via a control channel whether the UE rate-matches PDSCH around the resource elements indicated by the ZP-CSI-RS configuration in the subframe. The base station can transmit a CSI-RS in the resource elements that are subset of REs indicated by the ZP-CSI-RS configuration in the subframe. The base station can transmit an aperiodic CSI request to a second UE. The aperiodic CSI request can indicate, such as direct or request, the second UE to measure CSI based on resource elements in the subframe that are a subset of the ZP-CSI-RS configuration.

According to some embodiments, a UE can receive an aperiodic CSI request on a control channel in a subframe, where the CSI request requests CSI feedback for a serving cell. The UE can determine the CSI-RS resources for the serving cell are present in the subframe based on received aperiodic CSI request. The UE can determine CSI information based on CSI-RS resources for the serving cell in the subframe. The UE can then send the CSI information to the base station in a second subframe.

According to some embodiments, a UE can be configured with an aperiodic ZP-CSI-RS configuration and subframe offset via higher layers. The UE can also be configured with an aperiodic CSI-RS configuration and subframe offset via higher layers, where the RE's of CSI-RS can be a subset of RE's of ZP-CSI-RS. In a subframe a control channel a base station can indicate to the UE whether its PDSCH is rate-matched around the resource elements indicated by the ZP-CSI-RS configuration. In the same subframe, the UE can receive a CSI-RS in RE's that are subset of RE's indicated by the ZP-CSI-RS configuration. The UE can receive an aperiodic CSI request. The aperiodic CSI request can indicate, such as direct or request, the UE to measure CSI based on RE's indicated by the CSI-RS configuration in the subframe in which the CSI request was received. The UE can determine CSI information based on CSI-RS resources for the serving cell in the subframe, and send the CSI information to the base station in a second subframe.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of" followed by a list is defined to mean one, some, or all, but not necessarily all of, the elements in the list. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

The invention claimed is:

1. A method in a user equipment comprising:
   receiving, at the user equipment from a base station, downlink control information containing a channel state information request on a physical control channel in a subframe of a first serving cell, the channel state information request directing the user equipment to perform channel state information measurements for at least one aperiodic channel state information reference signal of a second serving cell;
   ascertaining channel state information reference signal resources in a subframe of the second serving cell based on at least the downlink control information contents;
   determining channel state information based on the ascertained channel state information reference signal resources; and
   sending the determined channel state information to the base station.

2. The method according to claim 1, wherein downlink control information contents for determining the channel state information reference signal resources are in at least one of a channel state information request field and another field of a control channel.

3. The method according to claim 1, wherein the ascertained channel state information reference signal resources in the subframe are also based on a higher layer signaled channel state information reference signal configuration for aperiodic channel state information reference signal transmission, where the higher layer is higher than a physical layer.

4. The method of claim 1, wherein receiving downlink control information includes receiving channel state information reference signal configuration information for the at least one aperiodic channel state information reference signal.

5. The method according to claim 1, further comprising:
   receiving zero power channel state information reference signal configuration information for an aperiodic zero power channel state information reference signal of the second serving cell;
   receiving, in a first subframe, a control channel indicating whether the user equipment's physical downlink shared channel in the subframe of the second serving cell is rate-matched around resource elements indicated by the zero power channel state information reference signal configuration information; and
   decoding the physical downlink shared channel in the subframe of the serving cell based on rate-matching around the resource elements indicated by the zero power channel state information reference signal configuration information when the downlink control information indicates the physical downlink shared channel of the user equipment is rate-matched around the resource elements indicated by the zero power channel state information reference signal configuration information.

6. The method according to claim 5, wherein the resource elements indicated by the channel state information reference signal configuration are subset of resource elements indicated by the zero power channel state information reference signal configuration information.

7. The method according to claim 1, wherein the second serving cell operates in an unlicensed spectrum.

8. A method in a base station comprising:
   transmitting, from the base station to a user equipment, downlink control information containing a channel state information request on a physical control channel in a subframe of a first serving cell, the channel state information request directing the user equipment to perform channel state information measurements for at least one aperiodic channel state information reference signal of a second serving cell, where the downlink control information includes an indication of resources for the aperiodic channel state information reference signal in a subframe of the second serving cell; and receiving, from the user equipment, in another subframe, a message containing the requested channel state information.

9. The method according to claim 8, further comprising sending the channel state information reference signal based on the indicated resources for the aperiodic channel state information reference signal in the subframe of the second serving cell.

10. The method according to claim 8, wherein contents of the downlink control information for determining the channel state information reference signal resources are in at least one of a channel state information request field and another field of a control channel.

11. The method according to claim 8, wherein aperiodic channel state information reference signal resources in the subframe are also based on a higher layer signaled channel state information reference signal configuration for aperiodic channel state information reference signal transmission, where the higher layer is higher than a physical layer.

12. The method according to claim 8, wherein the downlink control information also indicates granted resources on which the channel state information is sent by the user equipment to the base station.

13. The method according to claim 8, wherein the second serving cell operates in an unlicensed spectrum.

14. The method according to claim 8, further comprising:
signaling a zero power channel state information reference signal configuration for an aperiodic zero power channel state information reference signal for the user equipment via at least one higher layer, where the higher layer is higher than a physical layer; and
indicating via a control channel to the user equipment in a subframe as to whether the user equipment rate-matches physical downlink shared channel around resource elements indicated by a zero power channel state information reference signal configuration for an aperiodic zero power channel state information reference signal for the user equipment via at least one higher layer.

15. An apparatus comprising:
a transceiver that receives downlink control information containing a channel state information request on a physical control channel in a subframe of a first serving cell, the channel state information request directing the user equipment to perform channel state information measurements for at least one aperiodic channel state information reference signal of a second serving cell; and
a controller that ascertains channel state information reference signal resources in a subframe of the second serving cell based on at least the downlink control information contents and determines channel state information based on the ascertained channel state information reference signal resources,
wherein the transceiver sends the determined channel state information to a base station.

16. The apparatus according to claim 15, wherein the downlink control information also indicates granted resources on which the channel state information is sent by the user equipment to the base station.

17. An apparatus comprising:
a controller that controls operations of the apparatus; and
a transceiver that transmits, to a user equipment, downlink control information containing a channel state information request on a physical control channel in a subframe of a first serving cell, the channel state information request directing the user equipment to perform channel state information measurements for at least one aperiodic channel state information reference signal of a second serving cell, where the downlink control information includes an indication of resources for the aperiodic channel state information reference signal in a subframe of the second serving cell, and where the transceiver receives, from the user equipment, in another subframe, a message containing the requested channel state information.

18. The apparatus according to claim 17, wherein the controller performs a listen-before-talk procedure to determine if a carrier is clear for a carrier frequency corresponding to the second serving cell prior to sending the aperiodic channel state information reference signal on the second serving cell.

* * * * *

UNITED STATES PATENT AND TRADEMARK OFFICE
CERTIFICATE OF CORRECTION

PATENT NO. : 10,028,267 B2  
APPLICATION NO. : 15/650954  
DATED : July 17, 2018  
INVENTOR(S) : Nimbalker et al.

Page 1 of 1

It is certified that error appears in the above-identified patent and that said Letters Patent is hereby corrected as shown below:

On the Title Page

(63) Related U.S. Application Data:
"Continuation of application No. 14/672,356, filed on Mar. 30, 2015, now Pat. No. 9,743,392." should read --Continuation of application No. 14/672,356, filed on Mar. 30, 2015, now Pat. No. 9,743,392, which claims the benefit of Provisional application No. 62/109,928, filed on Jan. 30, 2015.--

Signed and Sealed this  
Eighteenth Day of June, 2019

Andrei Iancu  
*Director of the United States Patent and Trademark Office*